United States Patent [19]
Yasuike et al.

[11] 3,966,372
[45] June 29, 1976

[54] INJECTION MOLDING APPARATUS FOR FORMING A COMPOSITE, FOAM-SKIN, ARTICLE

[75] Inventors: Akio Yasuike; Takehiro Shibuya; Kaoru Toyouchi, all of Yokohama; Susumu Imai, Kanagawa, all of Japan

[73] Assignee: Asahi-Dow Limited, Japan

[22] Filed: May 16, 1974

[21] Appl. No.: 470,662

[30] Foreign Application Priority Data

| May 28, 1973 | Japan | 48-58706 |
| May 29, 1973 | Japan | 48-59331 |
| June 19, 1973 | Japan | 48-68299 |
| Dec. 3, 1973 | Japan | 48-134284 |
| Jan. 29, 1974 | Japan | 49-12013 |
| Apr. 15, 1974 | Japan | 49-42060 |

[52] U.S. Cl. .................. 425/4 R; 425/245 R; 425/817 R
[51] Int. Cl.² ............... B29D 27/00; B29E 3/00
[58] Field of Search ............ 425/133.1, 133.5, 4 R, 425/817 R, 245

[56] References Cited
UNITED STATES PATENTS

| 2,418,856 | 4/1947 | Stacy | 18/30 QP |
| 2,804,649 | 9/1957 | Hupfield | 425/245 |
| 3,097,396 | 7/1963 | Ludwig | 425/245 |
| 3,339,240 | 9/1967 | Corbett | 18/30 QP |
| 3,398,436 | 8/1968 | Nouel | 425/245 |
| 3,436,793 | 4/1969 | Trueblood | 425/159 |
| 3,894,823 | 7/1975 | Hanning | 425/245 R |

FOREIGN PATENTS OR APPLICATIONS

| 1,290,262 | 3/1962 | France | 425/130 |

Primary Examiner—Francis S. Husar
Assistant Examiner—Carl Rowold
Attorney, Agent, or Firm—Cushman, Darby & Cushman

[57] ABSTRACT

A first thermoplastic resin for forming the shell of an article is charged into the front portion of an injection cylinder and a second thermoplastic resin for forming the core of the article is charged into the rear portion of the injection cylinder. Both resins are substantially separated, being in contact only a central area of the cross-sectional plane of the injection cylinder. These thermoplastic resins are injected in a mass into a mold cavity with the second resin enveloped by the first resin, and finally solidified in the mold cavity resulting in a molded article having sandwich construction. Various sandwich articles can be obtained easily by means of a single injection molding machine. The process also allows repeated injection operations without exposure of the core material on the surface of the molded article.

6 Claims, 5 Drawing Figures

INJECTION MOLDING APPARATUS FOR FORMING A COMPOSITE, FOAM-SKIN, ARTICLE

The present invention relates to an improved process for injection molding articles having sandwich construction and an apparatus suitable for carrying out the above-mentioned process.

U.S. Pat. No. 2,996,764 discloses a method for producing fabricated articles composed of a plurality of thermoplastic materials by forcing into a mold cavity a quantity of a thermoplastic material comprising an organic polymer in a heat-plastified condition insufficient to fill said cavity, then forcing another heat-plastified thermoplastic material comprising an organic polymer into the mold cavity through the same port and into contact with the softened thermoplastic material previously fed to the mold, continuing the successive forcing of at least one such heat-plastified thermoplastic material to the mold cavity through said port in total amount sufficient to fill the mold cavity under pressure of the plastic material against walls defining said cavity to form a composite product, and thereafter cooling the material within said mold, preferably under pressure, and effecting or removing the composite molded product.

U.K. Pat. No. 1,156,217 also discloses a method for the production of articles having a cellular core and an unfoamed surface skin comprising injecting a predetermined amount of an unfoamable thermoplastic resin into a mold cavity and subsequently, and before the central portion of said unfoamable thermoplastic resin has set, injecting a thermoplastic resin composition containing a blowing agent at a temperature at or above the activation temperature of the blowing agent into the charge of the unfoamable thermoplastic resin that is in the mold cavity, and maintaining the composition within the mold for sufficient time to allow or cause the foamable composition to foam and the thermoplastic materials to set.

According to the method of the above U.K. patent, it is possible to introduce the skin forming resin into the front portion of a barrel of a single injection molding machine and the core forming resin into the barrel in the rear of the skin forming resin to inject successively these resins into a mold cavity. However, if the process is operated repeatedly, the second and subsequent molded articles will have the core forming resins exposed at the surfaces thereof.

On the other hand, the above U.K. Patent teaches another method for injecting successively the thermoplastic resins by using two separate injection molding machines and a change-over valve. This method, however, is disadvantageous in that a molded article has the so-called hesitation mark at the surface thereof because of temporal interruption of the flow on operation of the change-over valve and in that the thermoplastic resins are mixed in the change-over valve. Furthermore, this method is expensive, because it requires two injection molding machines.

German laid-open application No. 1,748,454 discloses a method in which the occurrence of the hesitation mark is avoided by injecting a foaming agent into the flow of molding materials in a distributing member through a injecting nozzle in accordance with a predetermined program. This method, however, must employ the same thermoplastic material for both core and skin of the article.

An object of the present invention is to provide a process and apparatus for injection molding articles having sandwich construction in which a beautiful molded article can easily be obtained by injecting the same or a different kind of thermoplastic resin irrespective of whether it is foamable or unfoamable by means of a single injecting mechanism.

The present invention provides a process for injection molding articles having sandwich construction by using an injection molding machine including an injection cylinder having at its front end a nozzle and mold means connected with said nozzle and having a mold cavity; said process comprising the steps of charging a first thermoplastic resin for forming the shell of an article into the front portion of said injection cylinder, charging a second thermoplastic resin for forming the core of the article into the rear portion of said injection cylinder so as to bring it into contact with the first resin in only a central area of the cross-sectional plane of said injection cylinder, injecting in a mass both of the first and second thermoplastic resins through the nozzle into the mold cavity with the second resin enveloped by the first resin and solidifying the injected resins in the mold cavity.

If the foaming resin is used as one or both of the shell- and core-forming materials, the process according to the present invention includes further foaming step in addition to the injection step. The foaming can be effected by enlarging the mold cavity after it is filled with a predetermined amount of the thermoplastic resins. The foaming also can be effected by precharging into the mold cavity a gas pressurized sufficiently to prevent the foamable resin from expanding and removing said gas from the mold cavity after the injection step.

Furthermore, if the unfoamable resin is used as a shell-forming resin and the foamable resin as a core-forming resin, the foaming step can be carried out by reducing the pressure within the injection molding zone after the injection step to reverse the foamable resin into said injection molding zone.

The apparatus for carrying out the process in accordance with the present invention comprises mold means haaving a mold cavity, an injection cylinder having at its front end a nozzle connected to said mold cavity, said cylinder including therein a front chamber adjacent to said nozzle and a rear chamber communicating with said front chamber in only a central area of the cross-sectional plane of said injection cylinder, means for supplying a first thermoplastic resin for the shell of an article to said front chamber of the cylinder, and means for charging a second thermoplastic resin for the core of the article in said rear chamber of the cylinder and applying an injecting force to the second resin in the rear chamber.

The thermoplastic resins used in the present invention includes all resins which generally may be injection molded. For example, there are low or high density polyethylene, polypropylene, polystyrene, ABS resin, SAN resin, polyvinylchloride, polymethylmethacrylate and the like. There may also be used polycarbonate, polyacetal, nylon, and ethylene copolymers such as ethylene-vinyl acetate copolymer, ethylene-ethyl acrylate copolymer, ethylene-unsaturated mono-fatty acid copolymer and the like. Furthermore, the above-mentioned resins may contain fillers such as glass fiber, powdered glass, calcium carbonate, calcium sulfate, talc, mica, asbestos, paper, wood chips and the like.

The present invention may use any one of the organic or inorganic foaming agents available. For example, there can be mentioned pentane, heptane and methanol having boiling points of 20° to 80°C under atmospheric pressure which have high critical temperatures and are condensable under pressure at about the foaming temperature. There may also be used thermally decomposable foaming agents such as azodicarboamide, ammonium bicarbonate and the like which generate at the foaming temperature uncondensable gas such as nitrogen, ammonia, carbonic acid gas.

In order to pressurize the mold cavity, there may be used a gaseous substance such as nitrogen, carbonic acid gas, air and the like which have boiling points lower than normal temperature. The pressure of the gas need not be so high as the condensing pressure of the foaming agent but is normally 15 $Kg/cm^2$ atg. or lower. Particularly, a pressure of 2 to 8 $Kg/cm^2$ atg. is sufficient when the condensable foaming agent is used.

In order that the invention may be clearly understood and readily carried into effect, embodiments thereof will now be described by way of example with reference to the accompanying drawings, in which.

Figure 1:
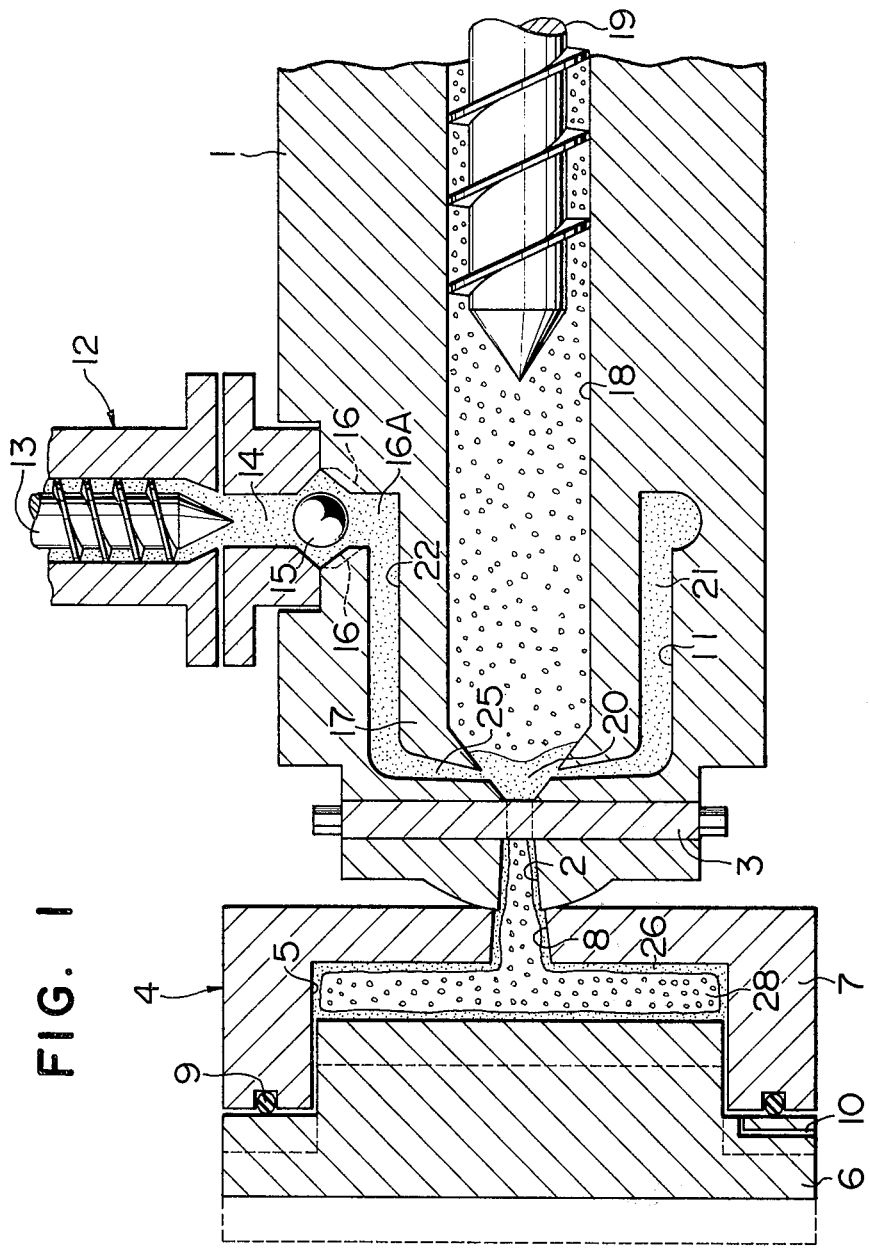
FIG. 1 is a fragmentary sectional view in a longitudinal direction of one embodiment of an injection molding machine according to the present invention.

Referring to FIG. 1, an injection molding machine comprises an injection cylinder 1 having at its front end a nozzle 2 which is adapted to be opened and closed by a cock valve 3. The nozzle 2 is connected with a mold means 4 having a mold cavity 5. As is well known, the mold means 4 comprises a male mold 6 connected to any suitable clamping mechanism not shown and a female mold 7 forming the mold cavity 5 with the male mold 6 and having a sprue 8 communicating between the mold cavity 5 and the nozzle 2.

A seal ring 9 is provided between the male and female mold 6 and 7. The male mold 6 also is provided with a passage 10 for introducing a pressurized gas into the mold cavity 5.

The injection cylinder 1 has a front chamber 11 adjacent to the nozzle 2 thereof. The rear portion of the front chamber 11 is connected with a conventional extruder 12 having a extruding screw 13 and an outlet 14 with a check valve 15. The check valve 15 allows a molding material to flow into the front chamber through grooves 16 on an inlet 16A of the injection cylinder 1 but prevents such material from reversing into the extruding chamber of the extruder 12.

An inner cylinder 17 extends within the front chamber 11 of the injection cylinder 1. This inner cylinder 17 defines a rear chamber 18 of the injection cylinder 1 on which is exerted an injection force by injecting means such as a conventional injecting screw 19. The rear chamber 18 is connected to the front chamber 11 through an opening 20 provided in the tip of the inner cylinder 17. The opening 20 is positioned in a central area of the cross-sectional plane of the injection cylinder 1. The end of the inner cylinder 17 is spaced apart from the end surface of the front chamber 11 which is provided with the nozzle 2. An annular space 21 is defined between the wall of the front chamber 11 and the outer peripheral surface 22 of the inner cylinder 17.

A thermoplastic resin for the shell of an article having sandwich construction to be molded is first fed into the front chamber 11 of the injection cylinder 1 from the extruder 12. This thermoplastic resin is hereinafter called a shell-forming resin. The shell-forming resin is accumulated in the annular space 21 and another space 25 between the respective end surfaces of the front chamber 11 and inner cylinder 17 under pressure. Next, another thermoplastic resin for the core of the article (hereinafter called a core-forming resin) is charged into the rear chamber 18 of the injection cylinder 1 by means of the injection screw 19 in a conventional manner. The core-forming resin is in contact with a portion of the shell-forming resin entering into the rear chamber 18.

Alternatively, charging of the core-forming resin may be performed prior to the aforesaid charging of the shell-forming resin.

When a predetermined amount of the respective shell- and core-forming resins are accumulated in both the front and rear chambers 11 and 18 under pressure, the cock valve 3 is opened and the injecting screw 19 is advanced so that these resins are injected into the mold cavity 5 through the nozzle 2 and the sprue 8 with the core-forming resin enveloped by the shell-forming resin. The composite in the mold cavity 5 consists of a shell 26 and a core 28 enveloped by the shell 26. The composite is then cooled and removed from the mold means 4.

If the core-forming resin is foamable, the male mold 6 is reversed by means of the mold clamping mechanism (not shown) to enlarge the mold cavity 5 thereby obtaining the article having a desired dimension. Otherwise, the mold cavity 5 is filled with a pressurized gas prior to the injection step. This pressurized gas is removed from the mold cavity 5 after the injection step to allow the foamable resin to expand.

Figure 2:
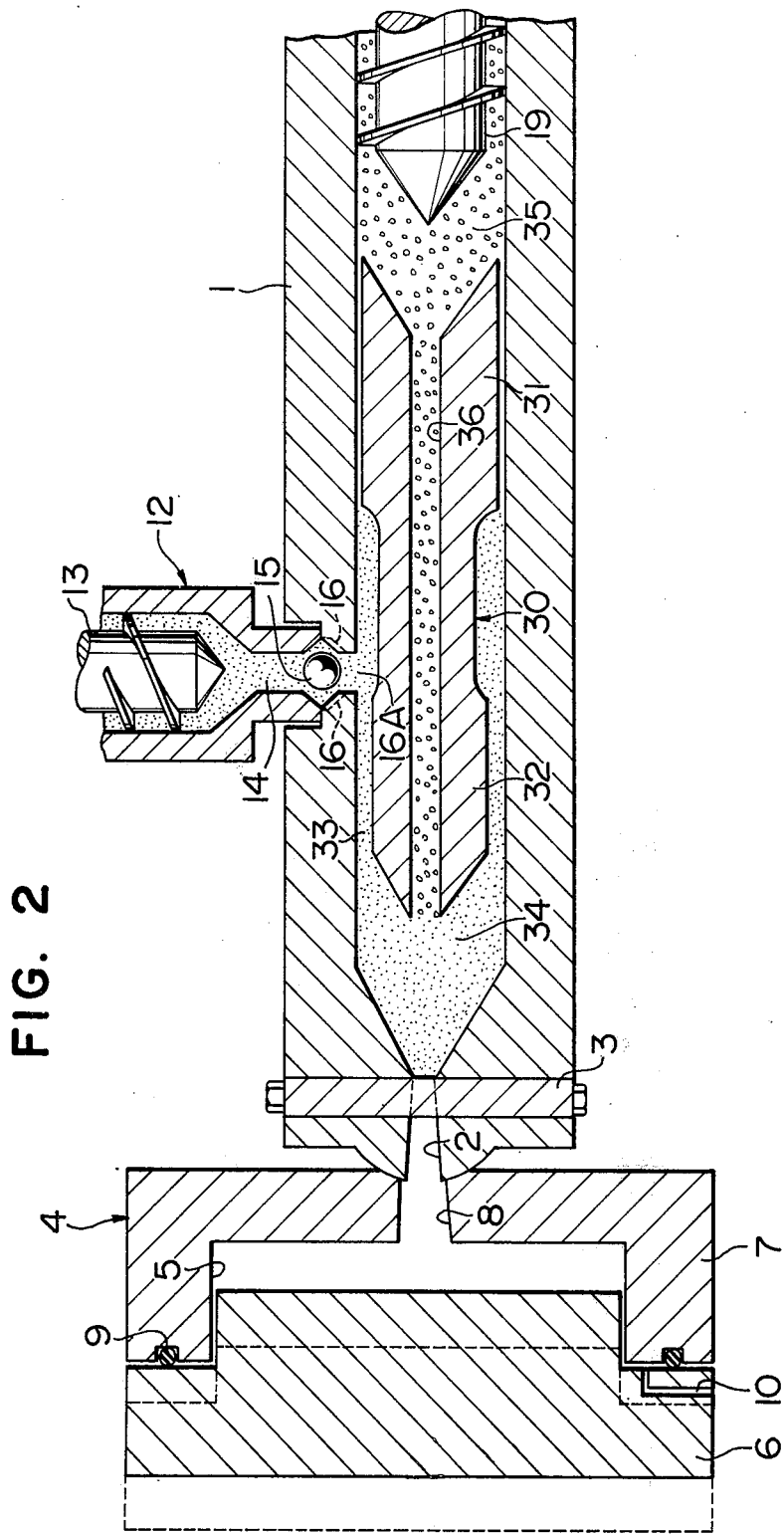
FIG. 2 is a view similar to FIG. 1 showing another embodiment of the injection molding machine according to the present invention.

FIG. 2 illustrates another embodiment of the injection molding machine according to the present invention. This machine is similar to the injection molding machine illustrated in FIG. 1 except that the injection cylinder has a movable mandrel contained therein.

The movable mandrel 30 has a rearward enlarged portion 31 fitted slidably in the bore of the injection cylinder 1 and a forward reduced portion 32 defining an annular passage 33 with the inside wall of the injection cylinder 1. Therefore, the mandrel 30 divides the bore of the cylinder 1 into two chambers 34 and 35. The movable mandrel 30 has a central passage 36 extending axially therethrough so that the rear chamber 35 is connected to the front chamber 34 in a central area of the cross sectional plane of the injection cylinder 1.

On operation, the cock valve 3 is closed at first and then shell-forming resin is fed into the front chamber 34 through the annular passage 33 from the extruder 12. As the shell-forming resin is charged in the front chamber 34, the mandrel 30 is backed by the extruding pressure of the extruder 12 corresponding to the charged amount of the shell-forming resin together with the injection screw 19.

Subsequently, the core-forming resin is plasticized and charged into the rear chamber 35 by means of the injecting screw 19 and accumulated in the rear chamber 35 and the central passage 36 of the mandrel 30 under pressure.

When a predetermined amount of the respective shell- and core-forming resins are fed, the cock valve 3 is opened and the injecting screw 19 is advanced to inject these resins into the mold cavity 5 through the nozzle 2 and sprue 8.

In the injecting step, if flow resistance in the central passage 36 of the movable mandrel 30 is equal to or less than the sliding friction of the mandrel 30 within the injection cylinder 1, the shell-forming resin is partially injected into the mold cavity 5 due to the movement of the mandrel 30 and thereafter the shell- and core-forming resins are simultaneously injected into the mold cavity 5 with the core-forming resin enveloped by the shell-forming resin.

If flow resistance in the central passage 36 is larger than sliding friction of the mandrel 30 within the injection cylinder 1, the shell-forming resin forces rearwardly the mandrel 30 without entering into the central passage 36 thereof because of the pressure loss in the central passage 36. In the injecting step, as the pressure in the front chamber 34 is larger than that in the rear chamber 35 by the pressure loss in the central passage 36, the shell-forming resin is first injected into the mold cavity 5 by the forward movement of the movable mandrel 30. When the tip of the mandrel 30 is engaged by the front portion of the cylinder bore, the core-forming resin is injected into the mold cavity 5 through the central passage 36 of the mandrel 30 by the injecting screw 19.

The shell- and core-forming resins which have been injected into the mold cavity 5 are cooled to set them resulting in an article having sandwich construction which may be removed from the mold cavity 5.

When unfoamable resin is used for molding the shell of the article and foamable resin is used for molding the core thereof, the male mold 6 is backed in a position shown by the dash line in FIG. 2 to enlarge the volume of the cavity 5 thereby obtaining the sandwiched article having a smooth skin surface. Otherwise, pressurized gas is pre-charged into the mold cavity 5 prior to the injecting step in order to prevent premature expansion of the foamable resin. Such gas is exhausted out of the mold cavity 5 after the injection step has been completed. If the mold cavity 5 is filled with such pressurized gas, the molding resins may be injected into the mold cavity 5 by a volume less than that of the cavity 5 to obtain a satisfactory expanded article.

Furthermore, if the mold cavity 5 is evacuated to a reduced pressure, the expanding of the foamable resin therein may be promoted to prevent a so called sink mark at the skin surface of the molded article and to increase the average expansion ratio thereof.

The movable mandrel 30 may be anchored in a position such that the tip thereof may be in contact with the front portion of the cylinder bore into alignment with the injecting nozzle 2. This may be effected by a piston-cylinder mechanism 40 illustrated in FIG. 3 which comprises a cylinder 41 fixed on a framework (not shown) and a piston 42 positioned operably therein. The piston 42 has a rod portion 43 extending into the bore of the injection cylinder 1 through the wall thereof to engage with a forward shoulder 44 of the movable mandrel 30.

Figure 3:
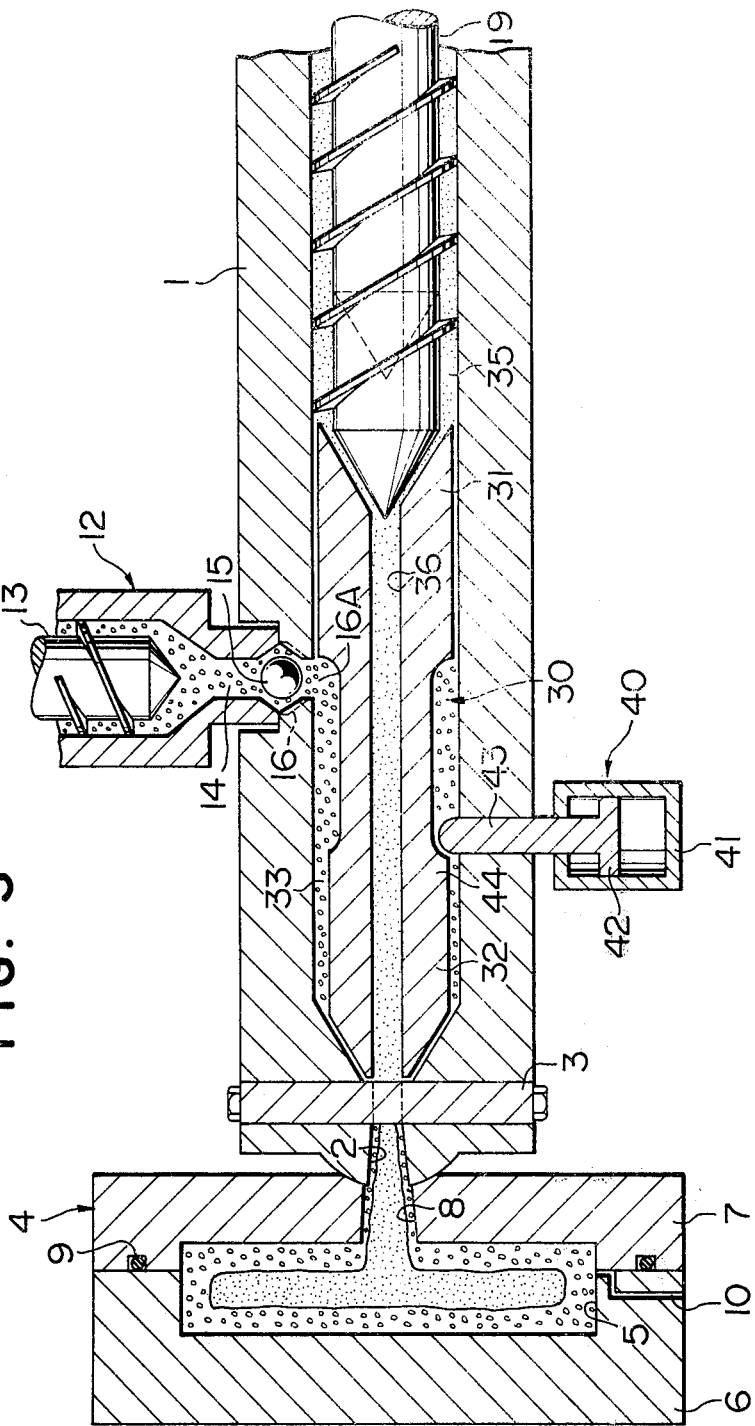
FIG. 3 is a view similar to FIG. 2 showing a further embodiment of the injection molding machine according to the present invention.

In this case, the injecting screw 19 may be reversed in a position as shown by the dash line in FIG. 3 to allow the foamable resin which is expanding in the mold cavity 5 to reverse into the central passage 36 of the mandrel 30. This can remove an excess of the foamable resin after the skin of the composite in the mold cavity 5 is partially hardened.

Figures 4, 5:
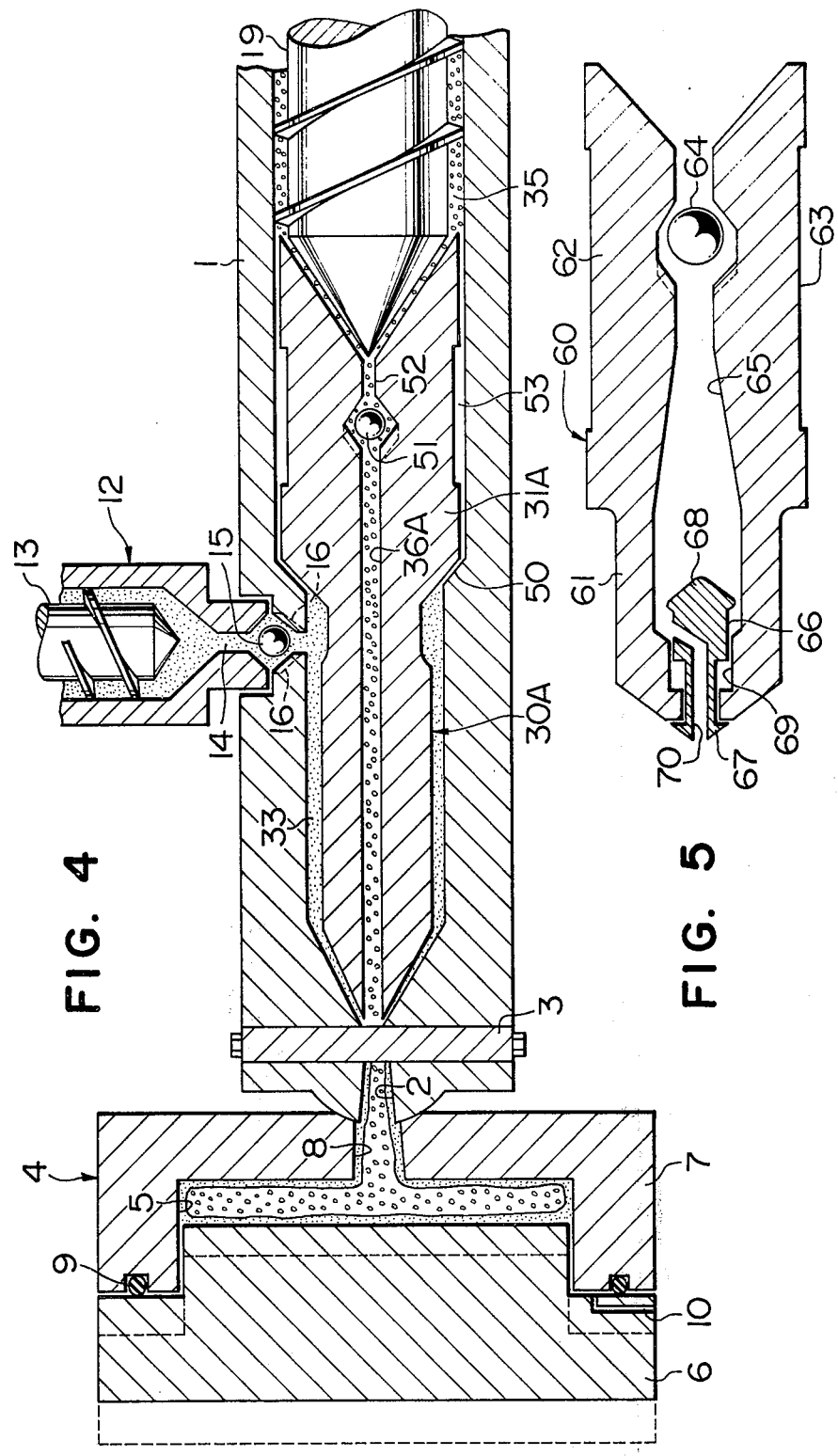
FIG. 4 is a view similar to FIG. 3 showing a still further embodiment of the injection molding machine according to the present invention.
FIG. 5 is a longitudinally sectional view of a modified embodiment of a movable mandrel used in the injection molding machine according to the present invention.

FIG. 4 shows a modified form 30A of the movable mandrel which has an enlarged portion 31A which may be engaged by an abutting shoulder 50 on the wall of the cylinder bore. This arrangement can prevent the tip of the mandrel 30A from being damaged by collision with the front portion of the bore. The movable mandrel 30A also has a check valve 51 in the central passage 36A thereof which can prevent completely the shell-forming resin in the front chamber 33 from entering into the rear chamber 35. The central passage 36A may have a reduced portion 52 for increasing the flow resistance and controlling the injecting operation. On the outer peripheral surface of the movable mandrel 30A a groove 53 is preferably provided in order to reduce frictional resistance of the mandrel in the bore of the injection cylinder 1.

FIG. 5 illustrates another modification 60 of the movable mandrel 30 which comprises a forward portion 61 and a rearward enlarged portion 62 having an outer periphery with a groove 63 similar to that of the mandrel shown in FIG. 4. The enlarged portion 62 is adapted to engage with an abutting shoulder similar to that of the cylinder bore in FIG. 4.

The movable mandrel 60 has a check valve 64 located in a central passage 65. The mandrel 60 also is provided with another valve 66 in the tip thereof which comprises a forward valve portion 67 which can protrude outwardly through the tip of the mandrel 60. An enlarged valve portion 68 is connected to the rear end of the forward valve portion 67. This enlarged valve portion 68 is slidable within a recess 69 on the mandrel 60. The valve 66 is provided with a passage 70 through the forward valve portion 67 and the enlarged valve portion 68.

In such an arrangement, as the molding material is charged rearwardly of the movable mandrel 60, the other valve 66 is forced forwardly by the material flowing through the central passage 65. The molding material in the central passage 65 is not injected into the mold cavity through the nozzle until the valve 66 is retracted by engagement of the tip thereof with the front portion of the cylinder bore so that the central passage 65 is connected with the nozzle through the passage 70 on the valve 66.

According to the present invention, it is possible to obtain satisfactory molded articles having sandwich construction with a smooth skin surface without any hesitation mark by a single injection molding mechanism. According to the present invention, the respective molding materials for the shell and core of the sandwiched article are separately charged in the front and rear chambers spaced apart from one another so that these materials cannot be mixed with each other and metered readily in respective amounts as desired.

EXAMPLE 1

A 20 oz.-injection molding machine constructed as shown in FIG. 2 was employed together with a plate mold having a length of 250mm, a width of 250mm and a thickness of 6mm and an extruder having a diameter of 32mm. The shell-forming material was polystyrene such as Styron 683 (trade-mark) manufactured by Asahi-Dow, Ltd. The core-forming material was rubber-reinforced polystyrene (Styron 492 : trademark, manufactured by Asahi-Dow, Ltd.) compounded with 2% by weight of commercially available titanium oxide. The shell-forming material was first plastified in the extruder and supplied into the injection cylinder therefrom at a cylinder temperature of 200°C. Next, the core-forming material was plastified in the rearward portion of the injection cylinder by means of the injecting screw at a temperature of 200°C and charged in the rear chamber (including the central passage thereof) under 100 Kg/cm$^2$ of back pressure of the injecting screw. The volumes of the shell- and core-forming materials were 140cc and 260cc, respectively. Finally, the materials were injected into the mold cavity under 225 tons of clamping force and 600 Kg/cm$^2$ of injecting pressure. After the composite in the mold cavity was cooled to set, it was removed from the mold cavity. The resultant article had a transparent glossy shell and a white earthenware-like core. The core was completely enveloped by the shell with a volume ratio of the shell to the core of 1:2.

EXAMPLE 2

The same arrangement as used in Example 1 was employed. The shell-forming material was polymethylmethacrylate (Delpet 60N : trademark, manufactured by Asahi Kasei Kogyo Kabushiki Kaisha). The core-forming material was styrene-acrylonitrile copolymer reinforced by glass fiber and colored black (Tyril GF XTR 6702 : trade mark, manufactured by Asahi-Dow Ltd.). The shell-forming material was first fed into the front chamber of the injection cylinder from the extruder at a cylinder temperature of 220°C and then the core-forming material was supplied to the rear chamber at the same temperature. The amounts of the materials were 140cc and 260cc, respectively. These materials were injected into the mold cavity under 225 tons of clamping force and 800 Kg/cm$^2$ of injecting pressure. The composite was removed from the mold cavity after cooling and setting. The resultant article had a transparent shell and a black core without any pattern inherent in glass fiber. The core was completely enveloped by the shell. The volume ratio of the shell to the core was about 1 : 2.

EXAMPLE 3

The same arrangement as used in Example 1 was employed. The shell-forming material was high density polyethylene (Suntec J240 : trade-mark, manufactured by Asahi Kasei Kogyo Kabushiki Kaisha) and the core-forming material was low density polyethylene (M2130, manufactured by Asahi-Dow Ltd.). The shell-forming material was first charged in the front chamber at a cylinder temperature of 220°C and then the core-forming material was fed into the rear chamber at 190°C. The materials were accumulated within the front and rear chambers in amounts of 140cc and 260cc, respectively. These materials were injected into the mold cavity under 225 tons of clamping force and 800 Kg/cm$^2$ of injecting pressure and a sandwiched article having fine glass and rigidity removed from the mold cavity after cooling and setting. The core was completely enveloped by the shell with the volume ratio of the shell to the core being 1 : 2.

EXAMPLE 4

The same arrangement as used in Example 1 was employed. The shell-forming material was polymethylmethacrylate (Delpet 60N : trademark, manufactured by Asahi Kasei Kogyo Kabushiki Kaisha) and the core-forming material was ABS resin (Stylac 100 : trademark, manufactured by Asahi-Dow Ltd.) compounded by 1.5 parts by weight of commercially available azodicarboamide. The materials were accumulated in the front and rear chambers in amounts 160cc and 140cc, respectively, at 220°C under 150 Kg/cm$^2$ of back pressure. These materials were injected under 225 tons of clamping force and 800 Kg/cm$^2$ of injecting pressure into the mold cavity which had been pre-charged with nitrogen gas pressurized to 8 Kg/cm$^2$ atg. After injection, the nitrogen gas was exhausted out of the mold cavity, and after 5 seconds this cavity was enlarged 1.7 times. The molded article obtained after cooling and setting had a transparent shell with a smooth skin surface and a cellular core enveloped completely by the shell. The volume ratio of the shell to the core was about 1 : 1.5 and the average expansion ratio was 1.7.

EXAMPLE 5

The same arrangement as in Example 1 was employed. The shell-forming material was polymethylmethacrylate (Delpet 60N : trade-mark) and the core-forming material was ABS resin (Stylac 100: trademark) compounded with 1.5 parts by weight of commercially available azodicarboamide. The materials were plastified at 220°C and accumulated in the front and rear chambers in amounts of 160cc and 170cc, respectively, under 150 Kg/cm$^2$ of back pressure. These materials were injected under 225 tons of clamping force and 800 Kg/cm$^2$ of injecting pressure into the mold cavity having a volume of 400cc which cavity was pre-charged with 8 Kg/cm$^2$ atg. of pressurized nitrogen gas. The pressurized gas was exhausted out of the mold cavity at the same time as the injection was completed. The resultant article had a transparent shell with a smooth skin surface and a cellular core enveloped completely by the shell. The average expansion ratio was about 1.2.

EXAMPLE 6

The same arrangement as in Example 1 was employed. The shell-forming material was polystyrene (Styron 683 : trade-mark, manufactured by Asahi-Dow Ltd.) and the core-forming material was the same polystyrene compounded with 1.0% by weight of commercially available azodicarboamide. The shell-forming material was plastified and supplied from the extruder at 200°C and subsequently the core-forming material was plastified and fed into the rear chamber at 200°C under 200 Kg/cm$^2$ of back pressure. The shell- and core-forming materials were charged in amounts of 140cc and 130cc, respectively. These materials were injected under 225 tons of clamping force and 600 Kg/cm$^2$ of injecting pressure into the mold cavity pressurized with 8 Kg/cm$^2$, of nitrogen gas. After injecting, the nitrogen gas was exhausted out of the mold cavity. The resultant article consisted of a transparent shell with a smooth skin surface and a fine cellular core enveloped completely by the shell. The average expansion ratio was 1.5.

Furthermore, the mold cavity was evacuated to a vacuum after the nitrogen gas had been exhausted.

Consequently, the article conformed more completely to the inner configuration of the mold cavity.

EXAMPLE 7

A 20 oz.-injection molding machine was employed together with a plate mold means having a length of 250mm, a width of 250mm and a thickness of 6mm and an extruder having a diameter of 32mm as shown in FIG. 3. The shell-forming material was polystyrene (Styron 683 : trade-mark) and the core-forming material was the same polystyrene impregnated with 1.5 parts by weight of n-pentane and compounded with 0.3 part by weight of commercial azodicarboamide and 1.0 part by weight of commercial powdered talc. The respective materials were plastified at 200°C and 220°C under 150 Kg/cm$^2$ of back pressure and accumulated in the front and rear chambers in amounts of 160cc and 240cc, respectively. These materials were injected into the mold cavity under 225 tons of clamping force and 800 Kg/cm$^2$ of injecting pressure. The mold cavity was pre-charged with 8 Kg/cm$^2$ of nitrogen gas and exhausted after completion of the injection. The movable mandrel was anchored by the piston-cylinder mechanism in a position in which it was engaged by the front portion of the cylinder bore into alignment with the nozzle. After 3 seconds, the injecting screw was reversed and then the cock valve was closed. The resultant article was removed from the mold cavity after cooling and curing. The article was a smoothly skinned molding without swirl marks. The average expansion ratio was 1.7. The foamable material reversed into the injection cylinder was reused in a subsequent plasticizing step.

When in the process the injecting screw was reversed while evacuating to vacuum the interior of the mold cavity after exhausting the pressurized gas, an article having a much smoother skin surface was obtained.

What is claimed is:

1. An apparatus for injection molding an article having a sandwich construction comprising: mold means having a mold cavity, an injection cylinder having at its front end a nozzle connected with the mold cavity of said mold means, a movable mandrel mounted slidably within said injection cylinder to divide the interior of the cylinder into front and rear chambers, said movable mandrel having at its forward portion a reduced part to form an annular passage together with the inside surface of said cylinder, said mandrel having a central passage therethrough aligned with said nozzle for connecting the rear chamber to the front chamber in only a central area of the cross-sectional plane of the injection cylinder, means for supplying a first thermoplastic resin for the shell of an article to the front chamber, said supplying means being connected with said annular passage, and means for charging a second thermoplastic resin for the core of the article in the rear chamber and for applying an injection force to the second resin therein.

2. An apparatus claimed as in claim 1, further comprising a valve located in said nozzle of the injection cylinder to open and close the nozzle.

3. An apparatus claimed as in claim 1, further comprising means for anchoring said movable mandrel in a position such that it is engaged by the front end of said injection cylinder with its inner extremity aligned with the nozzle.

4. An apparatus claimed as in claim 1 further comprising a cock valve located in said nozzle of the injection cylinder to open and close the nozzle.

5. An apparatus for injection molding an article having a sandwich construction comprising: mold means having a mold cavity, an injection cylinder having at its front end a nozzle connected with the mold cavity of said mold means, a movable mandrel mounted slidably within said injection cylinder to divide the interior of the cylinder into front and rear chambers, said mandrel having a central passage therethrough aligned with said nozzle for connecting the rear chamber to the front chamber in only a central area of the cross-sectional plane of the injection cylinder, wherein said movable mandrel has a check valve located in said central passage to prevent the counterflow of the second resin into the rear chamber, means for supplying a first thermoplastic resin for the shell of an article to the front chamber, and means for charging a second thermoplastic resin for the core of the article in the rear chamber and for applying an injection force to the second resin therein.

6. An apparatus claimed as in claim 5, wherein said movable mandrel has at its inner extremity a slidable valve for opening the front end of said central passage when the extremity of the mandrel is engaged by the front end of the injection cylinder under the action of said injecting force.

* * * * *